INVENTOR.
RAYMOND A. HEISLER

INVENTOR.
RAYMOND A. HEISLER

INVENTOR.
RAYMOND A. HEISLER

BY
Ralph R Roberts
AGENT

United States Patent Office 3,444,905
Patented May 20, 1969

3,444,905
METHOD AND APPARATUS FOR APPLYING PLASTIC GRIPS TO WIRE BAIL HANDLES
Raymond A. Heisler, 657 Dakota Trail,
Franklin Lakes, N.J. 07417
Filed Apr. 3, 1967, Ser. No. 628,085
Int. Cl. B21f *23/00, 45/00*
U.S. Cl. 140—75                        17 Claims

ABSTRACT OF THE DISCLOSURE

A method and apparatus for mounting a grip portion of plastic tubing on wire bail handles applied to containers. Plastic tubing is fed from a coil and in response to the actuation of a bail-forming and applying mechanism a determined length of tubing is moved into a cutoff and transfer arm whereupon the determined length of tubing is cut. The cut length of tubing is transferred and brought in the way of a wire being moved into the cutting, bending, and applying station of the bail-applying mechanism.

BACKGROUND OF THE INVENTION

*Field of the invention*

The field of art to which this invention pertains is in the general class of wire working and more particularly relates to the subclass of bails and in particular to those bails made of wire and adapted for attachment to eared containers usually metal.

*Description of the prior art*

U-shaped bails of wire are well known in the art and more recently apparatus combining the operations of forming and applying the bails. In particular, high speed apparatus for forming and applying a bail in one operation is represented in my U.S. Patent 3,241,578 of Mar. 22, 1966. The present invention to be hereinafter described relates to the providing of hand grips to the wire bails as made and applied by mechanisms, as for example, in the bail-applying apparatus shown in my above-referenced U.S. patent. In bails formed and applied by apparatus of this type, the bail is characterized in that it is a single length of wire usually of a diameter of ninety to one hundred twenty-five thousandths of an inch in diameter. This bail is applied to a container often containing paint of heavy consistency and the like which heavy container is often uncomfortable to carry by a plain bail by hand. Wire bail handles as provided on containers of more than one gallon capacity are conventionally characterized in that the bails, often adapted for application by hand to the containers after filling and at the point of sale, are in the form of a U with the midportion of the bail offset from the U to provide a straight portion upon which is mounted a stiff or rigid plastic or wooden hand grip intended to rotate on said midportion of the wire.

Rotatable hand grips on bails, although of a great convenience and highly desirable, have, prior to this invention, been difficult to apply in automatic equipment. A difficulty often occuring in the combined operation of cutting and bending the wire is the natural spring back of the wire after it is bent. The rotatable hand grip is then often mounted on a wire that has a slight amount of bend, which bend causes the hand grip to become wedged or locked on the wire and to not freely rotate. A rigid wedged or locked hand grip reduces the convenience in the hand-carrying of a heavy container, hence, it has been determined that in the present invention, the hand grip is made specifically for comfort and not for rotation. To provide this comfort, a portion of plastic tubing of sufficient length to allow grasping by the hand and of a sufficient resilience to cushion the impact of the weight of the contents in the container upon the fingers is mounted midpoint of the wire bail. The resulting resilient grip is comfortable to grasp and, if desired, permits the use of a bail wire of smaller diameter and of higher tensile for attachment to eared containers.

Insofar as is known, a bail-forming and applying mechanism of a type such as disclosed in my above-identified U.S. patent has not been combined with apparatus for automatically providing a hand grip on the bail. In particular, a grip formed of plastic tubing adapted to increase the comfort of carrying the loaded eared container and which is automatically cut and applied to the wire as the bail is formed is, as far as is known, a novel concept. The automatic apparatus hereinafter to be described is directed to bail-making and applying mechanism and to the operation thereof in an automatic manner and at a high speed to provide U shaped bails each with a midportion plastic grip and attached to an eared container.

*Summary of the invention*

The apparatus of this invention is adapted for use with bail-forming and applying mechanism as shown in or of the type identified in my U.S. Patent 3,241,578. In combination therewith, a plastic tube-feeding device is operatively connected to and is powered by the wire-feeding mechanism of the bail-forming apparatus so that as the wire is fed to the bail-forming mechanism a determined length of plastic tubing in a timed relationship to the wire feed is fed for a period of time into cutoff and transferring arm. The plastic tube-feeding apparatus to be hereinafter more fully described in conjunction with the attached drawings in which is shown the preferred embodiment includes a timing belt drive powered from the wire-advancing mechanism. The timing belt drives a Geneva drive mechanism adapted to make one-quarter of a revolution with every cycle of revolution of one of the positively driven wire-advancing guide rollers. In a direct response to every movement of the Geneva drive apparatus a pair of meshed gears are driven. Each of these gears in turn drives mating gears each carried by a shaft rotatably mounted in a pivotal arm. Each mating gear as it is rotated also rotates the shaft which also carries and drives a tubing drive roller adapted to cooperate with the other tubing drive roller and to grip between the rollers a determined diameter of plastic tubing.

As a supply for this tubing-advancing mechanism there is provided a coil or length of plastic tubing of a selected inner and outer diameter. This tubing is intermittently fed by the Geneva drive and as it is fed it is brought in the way of a tubing guide and cutoff die in the form of a tubular guide. From this die the tubing is fed into a grip and transfer device adjacent to the cutoff die the grip and transfer device having therein a U-shaped die portion into which the tubing is fed. After passing through this U-shaped die portion, the tubing enters a releasable grip portion and passes therethrough to the opposite side of the U-grip die. As a practical matter, the U-grip die is the length of the tubing to be cut to provide the plastic grip portion to the wire bail.

The cutoff and transfer member is attached to the end of a pivoted arm which arm is activated by a cam carried on a crank shaft of the bail-forming and attaching apparatus. This arm is moved in response to the cam so that the length of tubing in the U-grip die is cut and moved in timed relationship to the actuation of the bail-applying mechanism. The cut length of tubing at one extreme of movement of the arm is brought in the way of the wire being advanced in the apparatus for forming into a U-shaped bail. After the wire has entered and passed through the severed piece of plastic tubing, the tubing grip and transfer device is moved to its other extreme of movement which is its initial receiving position and while the forming of the bail and applying it to an eared container is completed.

It is an object of this invention to provide a grip-applying apparatus whereby, in concert with a wire-advancing means of a bail-forming and applying mechanism, a plastic tubing-advancing apparatus is moved in response to the actuation of the bail-applying mechanism. The tubing apparatus advances a determined length of plastic tubing through a tubing guide and die and into a cutoff and transfer arm carried by the bail-applying apparatus. The transfer arm is moved in response to the actuation of the bail-applying apparatus so as to cut the tubing and bring the severed piece of tubing in the way of a wire being fed into bail-forming and applying position.

It is a further object of this invention to provide a plastic tubing-advancing mechanism adapted to receive and advance from a roll of tubing a determined length of tubing of a given diameter, said tubing-advancing mechanism being moved in response to the actuation of a bail-applying mechanism and of a wire-advancing mechanism portion thereof and in timed relationship thereto.

It is a further object of this invention to provide a tubing-advancing, receiving, cutting, and transfer device adapted to receive a determined length of tubing and with the movement of the transfer arm in response to an actuation of a bail-applying mechanism to sever the tubing and move the cut portion of tubing into the path of an advancing wire and after the passing of the wire into and through the tubing the tubing cutting and transfer device is returned to its tube receiving position.

There has been outlined rather broadly the most important features of the method and apparatus for applying plastic grips to wire bail handles in which a determined length of cut plastic tubing is adapted to make the hand grip of this invention, and in order that the present contribution to the art may be more fully appreciated. Those persons skilled in this art will appreciate that the concept on which this present disclosure is based may be utilized to provide the basis for apparatus similarly designed to carry out the purposes of this invention.

There has been chosen a specific embodiment for the purpose of illustration and description of the apparatus of this invention. This embodiment is shown in the accompanying drawings forming a part of this specification wherein:

*Description of the preferred embodiment*

Figure 1:
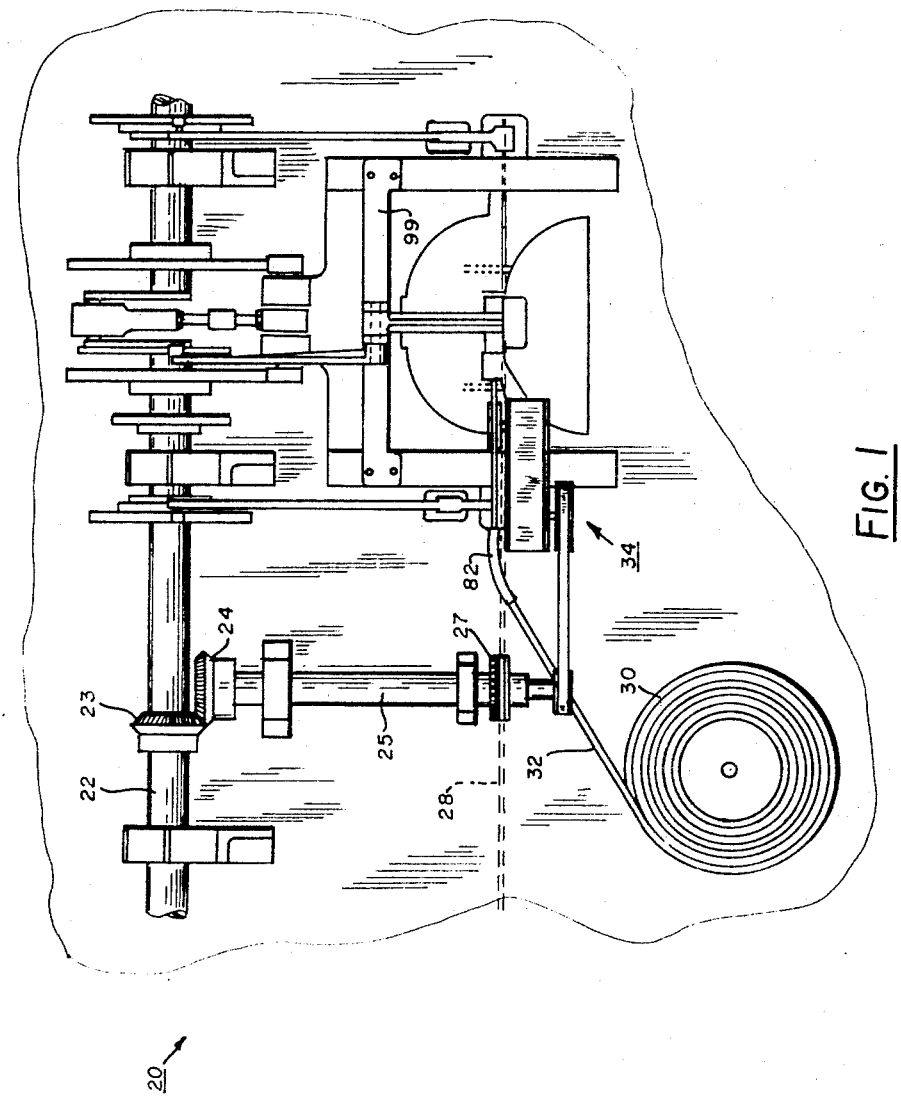
FIG. 1 represents a partially fragmentary side or face view of the upstream side of a bail-forming and applying mechanism with the plastic hand grip applying mechanism of this invention mounted thereon.

Referring next to the drawings in which like numbers refer to like members throughout the several figures and in particular to FIG. 1 wherein is shown the general arrangement of a tube-feeding apparatus in relation to a bail-applying apparatus similar to the apparatus of my above-identified U.S. patent. As seen, a bail-applying mechanism generally indicated as 20 has a crank shaft 22 upon which is mounted a pair of bevel gears 23 and 24 driving a vertical shaft 25 having mounted thereon one of a pair of wire-advancing sheaves 26 and 27, which sheaves are more clearly seen in FIG. 6. Shaft 25, although fully shown, is a partially diagrammatic representation for when mounted on a main plate of the bail-applying mechanism the shaft is usually on the far side of the main plate. This shaft 25 carries sheave 26 which is combined with a spur gear in driving arrangement with a like spur gear combined with sheave 27 to positively rotate this sheave 27 as sheave 26 is rotated. Between the wire-advancing sheaves, as seen in FIGS. 1 and 6, a wire 28 is advanced into a wire passageway more fully described in my above-identified U.S. patent.

Figure 2:
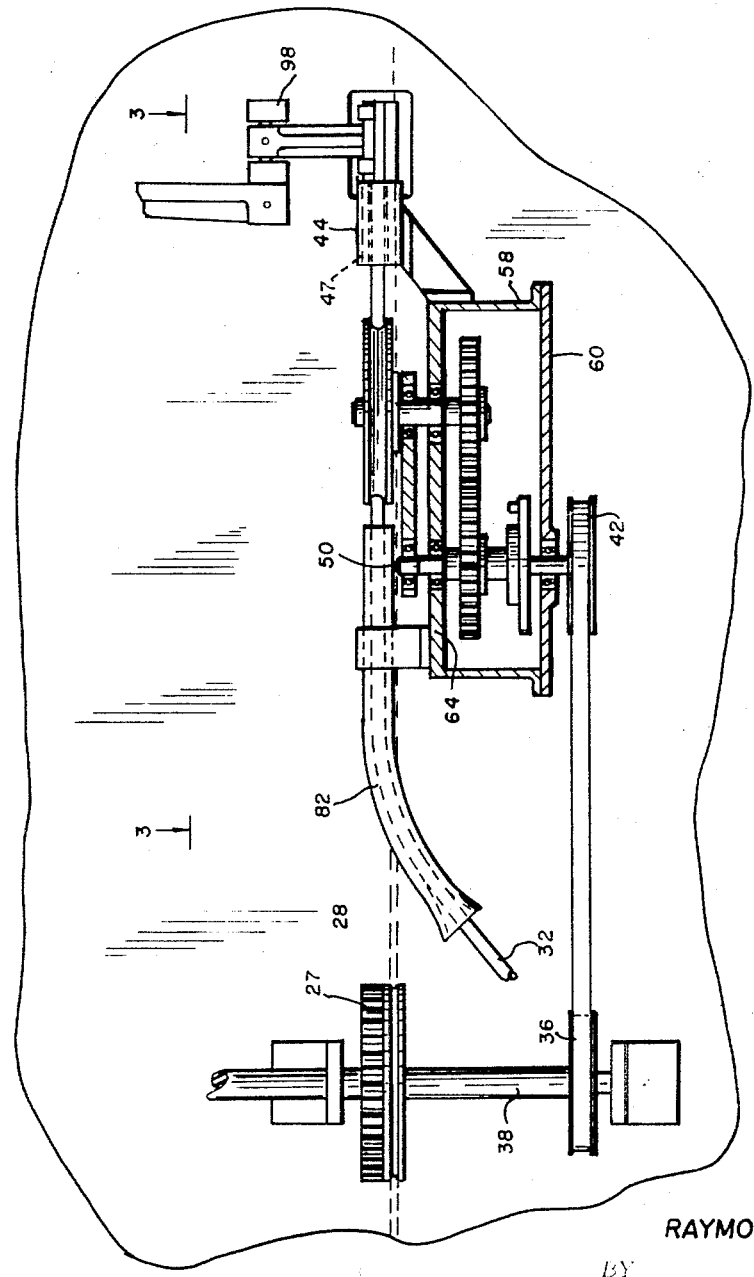
FIG. 2 represents in an enlarged fragmentary and partly diagrammatic view the wire-advancing apparatus of the bail-forming mechanism as adapted to drive the plastic tubing-advancing mechanism of this invention, the tubing-advancing mechanism shown partly in section.

From a coil of plastic tubing 30 an extending length of tubing 32 enters a tube-feeding or advancing mechanism generally indicated as 34. This mechanism is powered by a timing belt arrangement in which a driver timing belt pulley 36, as seen in FIGS. 1, 2 and 6, is mounted on the downwardly extending portion of and is rotated with a stub shaft 38, which shaft is driven by the rotation of the grooved wire sheave 27. A timing belt 40 extends from pulley 36 to a driven timing belt pulley 42 which powers the tube-feeding or advancing mechanism 34 more fully seen in conjunction with FIGS. 2 and 3. Tubing 32 is advanced to and through a die member 44 also seen in FIGS. 2 and 3, which die member has a passageway therethrough sized for a sliding fit of the tubing 32. This die is preferably made with a removable hardened steel liner or bushing 47 which is sized so that at its distal face 46 it provides a closely defined circular passageway for the tubing 32 as it leaves the die and enters a tubing cutoff and transferring device generally indicated as 48. The liner or bushing is made removable and replaceable to accommodate wear and to permit size changes for different size tubing.

Figure 6:
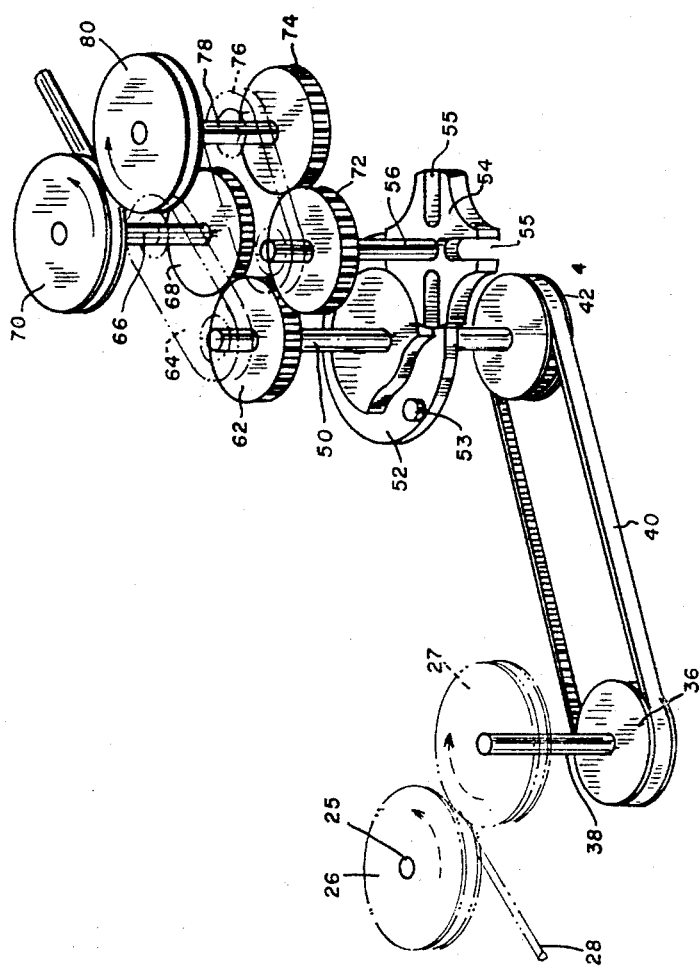
FIG. 6 represents a somewhat diagrammatic isometric view showing the drive mechanism as arranged for the transmission of the power from the wire-advancing mechanism to the tubing-advancing mechanism of this invention.

Referring now in particular to FIGS. 2 and 6, it is to be noted that as wire 28 is advanced through rotation of sheaves 26 and 27, the near shaft 38 as it is rotated drives pulley 36 which in turn drives timing belt 40 which rotates driven timing pulley 42. Timing pulley 42 as it is rotated likewise rotates shaft 50 upon which it is mounted and upon which is carried the pin plate member 52 of a one-to-four Geneva drive. This pin plate member has a pin 53 thereon adapted to engage the slotted member 54 of the Geneva mechanism. The four slots are identified as 55 and as engaged by and driven by pin 53 move member 54 which is mounted on and drives shaft 56. It is to be noted in FIGS. 2 and 3 that the shafts 50 and 56 are carried in a housing 58 and in a cover 60 mounted thereon and are rotatable in ball bearings carried therein. It is to be noted that the shaft 50 as seen in FIGS. 2 and 6 carries a spur gear 62 which is freely rotatable on the shaft. Mounted on this shaft and immediately above this gear there is an arm 64 which as seen in FIG. 2 and in phantom outline in FIG. 6 is mounted on a bearing on shaft 50 so that the arm 64 although supported by shaft 50 is not rotated as the shaft is rotated. The opposite end of this arm likewise carries a bearing within which is supported and rotated a shaft 66. The bottom portion of this shaft has fixedly mounted thereon a spur gear 68 which is in mesh with and is driven by spur gear 62. The shaft 66 extends through and above the arm 64 which is above the housing, said shaft carries one-half of the tubing drive means in the form of a grooved pulley 70. As shaft 66 is rotated by the gear 68 the pulley 70 is also rotated.

Referring in particular to FIG. 6 it is to be noted that shaft 56 carries and rotates a spur gear 72, which gear is in mesh with and drives spur gear 62 as well as a spur gear 74 also in mesh with gear 72. Above the gear 72 and housing 58 is arm 76 which, in the manner of arm 64, is carried in a bearing on shaft 56 so that shaft 56 may be rotated without causing rotation of arm 76. On the opposite end of this arm there is a bearing carrying a shaft 78 rotated by and carrying gear 74. As gear 74 is rotated by gear 72, a grooved pulley 80 mounted on the upper end of and driven by shaft 78 is rotated to cooperate with the rotational movement of the grooved pulley 70.

Referring once again to FIGS. 1, 2 and 3 it is to be noted that the tubing 32 is fed into and is carried by means of a tubing guideway 82 into a driving and advancing position between the two tube-advancing pulleys 70 and 80. The pulleys are turned in the direction indicated by the arrows and are spaced so as to grip and advance the tubing as they are rotated.

Referring to FIGS. 2 through 5, 7 and 8, it is to be noted that after being advanced by the grooved pulleys 70 and 80 the tubing 32 is moved into the die 44. As the tubing exits from the die at 46 it enters the cut and transfer mechanism 48 and is retained in an arm and U-member 84 having U-side portions 85. Carried on this arm and between the sides 85 there is an upper pivoted member 86 rotatably supported on a pivot pin 88 mounted in side portions 85. Mounted in pockets in the arm 86 is a pair of like sized springs 89 and 90 which are compressed so as to urge the two outer end grip portions 91 and 92 forwardly until a pair of adjustable stops 94 threadedly mounted in the extending portions 91 and 92 engage a lower or supporting portion of arm 84.

Figure 8:
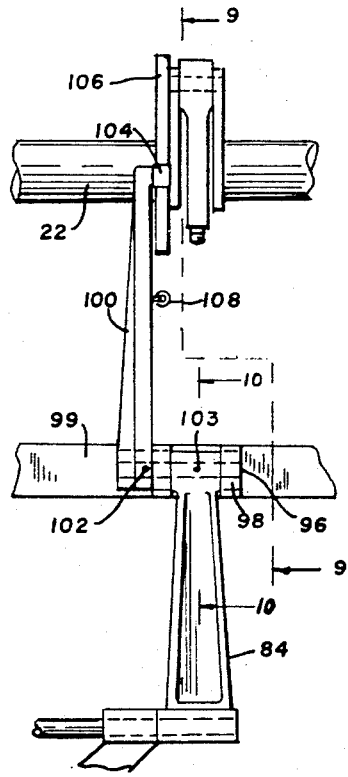
FIG. 8 represents in an enlarged scale a partial front view showing the cutoff and transfer arm assembly and its means of actuation by a cam drive carried by the crank shaft of the bail-forming apparatus.
Figure 9:
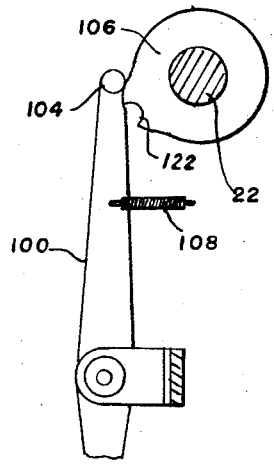
FIG. 9 represents a partly fragmentary side view of the arm assembly of FIG. 8 and taken on the line 9—9 of FIG. 8 and, FIG. 10 represents an enlarged side view, partly fragmentary, showing the bearing support of the cutoff and transfer arm assembly.
Figure 10:
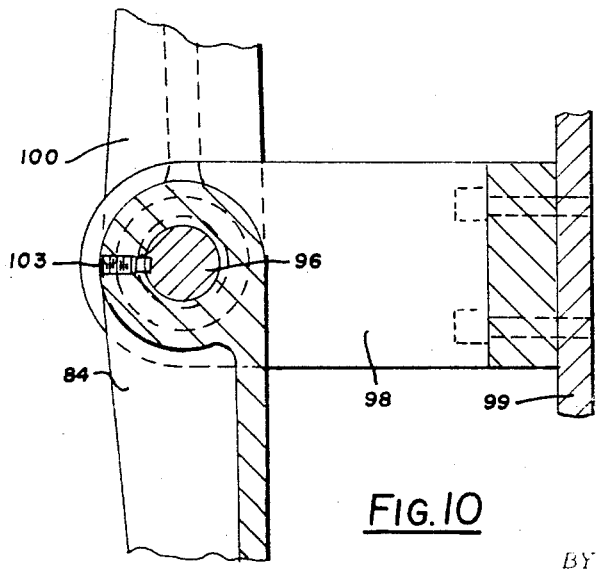

Referring finally to FIGS. 8, 9 and 10, there is shown a preferred means for moving the arm 84 in precise timed relationship to the rotation of the crank shaft 22. The upper end of 84 is pivotally carried on a shaft 96 carried in bearings in a support block 98. This block is mounted on a transverse support member 99 attached to guides or other portions of the bail-applying mechanism. The shaft 96 extends leftwardly (FIG. 8) from the support block and mounted thereon is a follower arm 100 which is pinned to the shaft 96 as by a set screw 102. In like manner the arm 84 may be pinned to the same shaft by a set screw 103.

The upper end of follower arm 100 has mounted thereon a cam follower 104 which is moved in response to a cam 106 carried on shaft 22. The follower 104 is urged into engagement with the cam 106 by means of a spring 108 which is of sufficient strength to move the arm to the outer limit loading position for the receiving of the plastic tubing and to maintain the transfer end in alignment with the advancing plastic tube 32 until the cam 106 causes arm 100 to be moved forwardly.

*Use and operation*

The plastic tube-feeding apparatus above-shown and described includes a power-connective means to the bail-applying mechanism in that, as shaft 22 is rotated, the bevel gears 23 and 24 are also rotated to drive shaft 25 and the wire-advancing grooved pulleys 26 and 27. As these pulleys are rotated to advance the wire as described in my above-identified U.S. patent, the shaft 38 is also rotated, actuating the power-connective means of the timing belt drive of components 36, 40 and 42 to cause shaft 50 to rotate. For every revolution of the Geneva pin plate member 52 the mating slotted member 54 of the Geneva mechanism is advanced or rotated one-quarter of a revolution and, as reduced to practice, provides that for every length of wire fed by groove pulleys 26 and 27 the plastic advancing grooved pulleys 70 and 80 in and at a determined period of time grip and advance a determined length of plastic tubing which in the present instance is approximately three and three-eighths inches of the tubing 32.

As the tubing 32 is contemplated to be of very inexpensive manufacture, it is desirable that the spacing of the pulleys 70 and 80 to each other be adjustable to accommodate the manufacturing variations in the outer diameter of the tubing usually produced by high speed extrusion methods. Adjustment also is desirable so that they, the pulleys, may be spaced to accommodate thicker and thinner tubing and differing outer diameter sizes. As arranged, the pulley shafts 66 and 78 and gears 68 and 74 thereon are carried by arms 64 and 76. In response the positive rotation of shaft 56 the gear 72 is rotated and in turn drives the gear 62. These gears 72 and 62, as they are rotated, drive the meshing gears 68 and 74 so that as shaft 56 is rotated one-quarter of a revolution a like determined amount of rotation is imparted to shafts 66 and 78 and to grooved pulleys 70 and 80. The circumference of these pulleys determine the amount of tubing fed and, as reduced to practice, they are made removable and replaceable so that different size pairs may be provided for various manufacturing hand grip preferences. As contemplated and as reduced to practice, the arms 64 and 76 are pivotally carried on the shafts 50 and 56 which are in fixed relationship to the housing 58 and cover 60 by means of the bearings fixedly mounted therein. The ends of the arms carrying shafts 66 and 78 are movable toward and away from each other with slots provided in the top member of the housing 58 for the movement of the shafts therein. A clamp means, not shown, is carried by the housing and provides a means for retaining the arms 64 and 76 in a fixed relationship to each other and the housing 58 after adjustment has been made to provide the desired spacing of the pulleys 70 and 80.

As the plastic tubing is advanced by the Geneva mechanism powered in response to the advancing action of the wire drive, a determined amount of tubing 32 is fed through the die member 44 and brought in the way of and advanced through the tube passageway of transfer apparatus 48.

Figure 7:
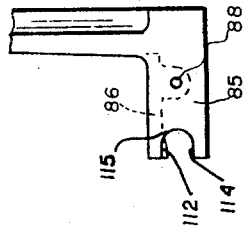
FIG. 7 represents a fragmentary side view showing the lower end of the tubing cutoff and transfer arm and taken on the line 7—7 of FIG. 3.

Referring particularly to FIG. 7 it is to be noted that in sliding contact with the distal face 46 of the die member 44 is the transfer arm 84 which has formed in its sliding side portions 85 a U-shaped cutout with facing straight side portions 112 and 114. In the present embodiment the facing sides 112 and 114 are adapted to substantially define the diameter of the tube forming the hand grip. These faces terminate in the inner curved surface 115 which is nominally the diameter of the tubing being fed. During the non-driving portion of the Geneva drive cycle the transfer member 48 is moved and the tube portion therein is sheared from the tubing in the die 44. The shearing is produced at the sliding contact between distal face 46 and the side of the transfer member 48 and that portion of the tubing in the transfer arm 48 is the portion cut to a determined length. As the cut tubing length is swung forwardly in member 48 and into the way of the advancing wire 28 the lower portion of the member 48 moves into a cutout 116 as seen in FIGS. 2, 4 and 5.

Figures 4, 5:
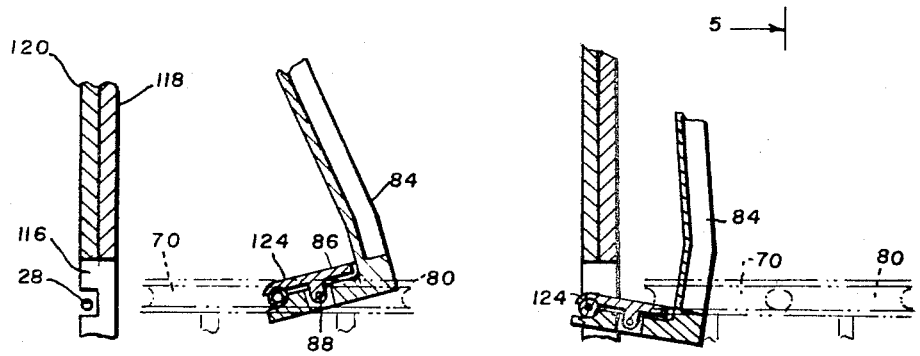
FIG. 4 represents a fragmentary sectional view of the tubing cutoff and transfer arm and showing in particular the tubing grip mechanism at one limit of movement and in the position to receive the tubing, the view taken on the line 4—4 of FIG. 3.
FIG. 5 represents a fragmentary sectional view of the apparatus of FIG. 4 but with the tubing transfer arm moved to the other limit of movement so that the cut tubing is axially aligned with the wire for the passing of the wire therethrough.

In FIG. 4 is indicated the position of the advancing wire 28 at is passes in front of the main plate and midway of the cutout 116 in a main plate 118 and below a U-forming member 120. In the exemplified operating sequence, the wire 28 is fed through cutout 116 after the transfer arm 84 with the cut tubing therein is brought into the cutout. As seen in FIG. 5, the tubing has been cut and the arm 84 has been advanced into the cutout. After the tubing has completed its transfer motion the wire 28 is advanced to and through the bore of the tube while it is held by the transfer member 48.

After the wire has passed through the cut tube portion, the cam 106 as it is moved in timed rotation brings the lobe 122 into engagement with follower 104 to actuate arm 84 and move the end thereof to the position shown in FIG. 4. To insure that the cut tubing portion does not fall from an open U it is provided that the member 86 be spring biased to a determined closed position. The outer ends 91 and 92 are formed with curved outer portions 124 (FIGS. 4 and 5) adapted to retain the tubing as it is cut and transferred. After the wire 28 has been passed through the cut tube portion the arm 84 is moved from the position seen in FIG. 5 and as it moves the ends 124 are caused to be cammed from the tube pivotally moving member 86 to further compress springs 89 and 90. As the arm 84 is returned to its loading position (FIG. 4) the springs 89 and 90 urge the member 86 to be rotated on pin 88 to its closed limit position.

Figure 3:
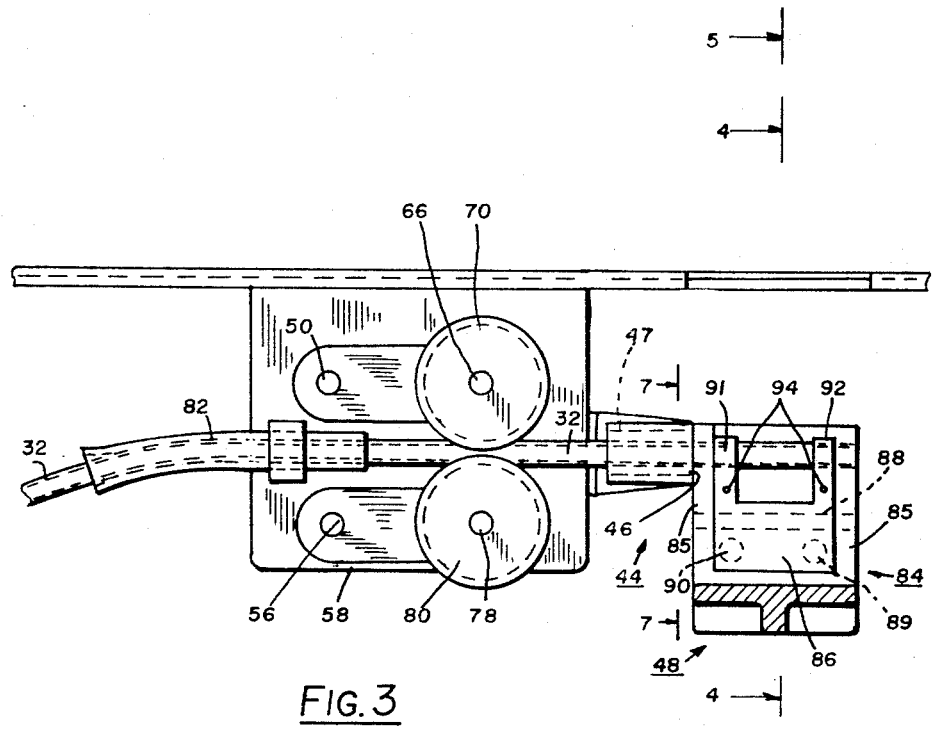
FIG. 3 represents a fragmentary plan view looking downwardly on the plastic tubing feeding and the cutoff and transfer mechanism of FIG. 2 and looking in the direction of the arrows as taken on the line 3—3 of FIG. 2.

It is to be noted that shown in phantom outline in FIGS. 4 and 5 are the tube-advancing pulleys 70 and 80. This showing is made to show the relationship of the paired pulleys to the main plate 118 and cutout 116. It is also of note that, as exemplified, the arm 84 swings inwardly and downwardly from the one extreme of movement of FIG. 4 and the axial alignment with the passageway between the pulley 70 and 80 to a position below the same pulleys when the arm end is in the other extreme of movment as seen in FIG. 5. Of course, as seen in FIG. 3, the pulleys 70 and 80 are upstream from the sectional views of FIGS. 4 and 5.

Noting that as the wire drive is moved in precise relationship to the rotation of shaft 22, the cam 106 carried on shaft 22 precisely actuates the cam follower 104 and the pivoted arm 84 so that the arm 84 likewise moves in timed relationship to the advancement of the wire. The tubing 32 is advanced into the cutoff and transfer member 48 by the one-quarter movement of the Geneva drive after which the advance is stopped and this determined length of tubing is cut and transferred in the way of the advancing wire. After the wire is passed through the tube the bail is formed into a U in the manner disclosed in my U.S. patent. As reduced to practice, the tubing bends with the wire to form a hand grip in the form of a partial U and actually provides a hand grip which in essence is non-turning.

It is contemplated that the tubing 32 may be made in the form of undulated diameters whereupon the tubing-advancing pulleys 70 and 80 likewise have their channel carrying portions contoured to accept the spaced diameter variations of the tubing. It is therefore contemplated that the pulleys 70 and 80 are keyed to the respective shafts and are removably mounted thereon with retaining means on the upper end of the shaft provided in the form of nuts or snap rings.

As reduced to practice, for wire bails having a cross-section of approximately ninety thousandths of an inch diameter or less, the tubing preferably has a formed inner diameter of at least one-hundred thousandths of an inch or more. The exterior of the tubing may be approximately five-sixteenths of an inch in diameter. The length of the tubing cutoff by the transfer arm 48 is contemplated to be approximately three and three-eighths inches, which provides a substantial length for the grasping of the hand of the normal user. Three and three-eighths inches is also about the right length for wire bails of approximately one-eighth inch in diameter cross-section. This heavier bail is conventionally used on bailed containers of two, two-and-a-half and five-gallon capacity. The diameter of the tubing, however for these larger containers is increased in size to approximately three-eighths of an inch outside diameter and about one-quarter inch inside diameter with the durometer of the tubing preferably at about forty-five to fifty-five on the Shore scale. Plastic or like tubing of a harder or softer characteristic can of course be used.

It is contemplated that the wire bail to which the plastic hand grip is applied may be a modified U shape in which a determined midportion length is left substantially straight and upon this midportion a cut length of plastic tube is mounted. The cut plastic tube is preferably shorter than the midportion of the wire bail. The wire lengths extending from both sides of the midportion are curved by the wire-bending apparatus into substantially quarter-circles and have their free ends formed for mounting into the bail ears of containers. Whether a plain U shape or modified U shape is provided on the bail the mounting of a plastic tubing on the wire by the apparatus as above-described is the apparatus contemplated for both the plain and modified U shape.

It is to be noted that the shaft 25 driving the wire feed may be moved to the rear or downstream side of the main plate, however, in such arrangement the wire groove pulley 26 would be mounted on a short shaft and wire groove pulley 27 and timing belt pulley would be mounted on this newly located shaft.

It is contemplated that the use of a four-slot Geneva mechanism is merely illustrative of one means of feeding a small amount plastic tubing in response to or simultaneously to the feeding of a larger amount of wire.

The length of the tubing used for the wire grip may be any selected length and the size of and amount of rotation of pulleys 70 and 80 may be selected to suit the desired conditions. The amount of tubing to be fed may also be changed by altering the ratio of the pulleys 36 and 42 and where the length of the wire bail is increased and the length of the wire grip is maintained at about three and three-eighth inches, the Geneva drive may be changed to a one-in-five or some other desired ratio.

It is to be noted that the providing of a plastic handgrip on a wire bail reduces the strain or cutting effect of said wire bail of a loaded container on the hand or fingers of the used. The cushion effect of the plastic handgrip permits a bail to be made of a smaller wire of higher temper or tensile. The smaller, higher temper wire is usually less in cost and the increased temper in the wire makes the bail as strong as a thicker bail of lower temper. The economies effected by a change in the wire size partly offsets the cost of the plastic tubing used to make the handgrip.

The advancement of the tubing may also be by a pneumatic or hydraulic cylinder means, by a solenoid, by mechanism driven from the crankshaft 22 or by other means. The concept of advancing a determined length of plastic tubing into a cutoff and transfer arm and then cutting the tube by shearing the tube and transferring the cut length into the way of an advancing wire prior to the bending of the wire into a U bail is believed to be new and novel.

Method

The novel method in which a plastic handgrip is provided on a wire bail handle and with the handgrip being cut from a longer length of tubing and transferred to a precise position in axial alignment with a straight length of wire before the wire is bent into a U shaped bail includes the steps: advancing a length of plastic tubing and the like into and through a die; feeding a determined length of tubing into a cutoff and transfer apparatus to a second limit of operation so that as the apparatus is moved it cuts and transfers the tube portion in the apparatus; maintaining the cutoff tube in the second limit of operation while a wire for making a bail is advanced to and through the cut tubing; releasing the cutoff and transfer apparatus from the cut tube portion after the passing of the wire therethrough, and returning the cutoff and transfer apparatus to the first limit of operation.

Terms such as "left," "right," "up," "down," "front," "back" and the like are applicable to the embodiment shown and described in conjunction with the drawings. These terms are merely for the purposes of description and do not necessarily apply to the position in which the plastic handgrip applying apparatus may be constructed or used.

The conception of the plastic handgrip applying apparatus of this invention and its many applications is not limited to the specific embodiments shown but departures therefrom may be made within the scope of the accompanying claims and without sacrificing its chief advantages and protection is sought to the broadest extent the prior art allows.

What is claimed is:

1. In an apparatus for applying plastic grips and the like to wire bail handles, said apparatus being used in combination with a wire bail-forming and attaching apparatus adapted to provide eared cans with wire bails and in which the plastic grip-applying apparatus includes; (a) means for advancing a determined length of tubing from a longer length; (b) a die sized so as to slidably receive and retain the tubing as it is advanced therethrough; (c) a cutoff and transfer apparatus adapted to receive the advancing end and a determined length of tubing; (d) means for moving the transfer apparatus from a first limit of movement wherein it is disposed to receive the advancing tubing as it exits from the die and for moving said apparatus to a second limit of movement whereupon as it is moved from the first to the second limit of movement the cutoff portion of the apparatus severs the tube adjacent the die and transports the cut tube portion to a second limit of movement in axial alignment with an advancing wire length from which the bail is formed, and (e) means for releasing the cut tube portion from the transfer apparatus after the passage of the wire through the tube.

2. In an apparatus for applying plastic grips as in claim 1 in which the means for moving the cutoff and transfer apparatus is a cam actuated means including a cam carried and rotated by a crankshaft of a bail-forming and attaching apparatus and a cam follower carried on one end of a pivotally movable arm member of the cutoff and transfer apparatus, said arm movable by a differential of cam displacement to move the cutoff and transfer apparatus to the first and second limits of movement.

3. In an apparatus for applying plastic grips as in claim 1 in which the means for releasing the cut tube portion is a pivotally mounted grip member of the cutoff and transfer apparatus, the grip member having a curved portion providing a cam surface on the outer end of said mounted grip member and curved so that as urged by a bias means is moved into a tube gripping position and with the tube in engagement with the cam surface as said cam surface grips the outer surface of the wire retained tube and is moved over said outer surface, the grip member is pivotally moved against the bias means and into a releasing condition with the cut tube portion.

4. In an apparatus for applying plastic grips as in claim 3 in which the die is formed with a tube carrying passageway having a substantially circular cross-section and with its discharge end adjacent the cutoff and transfer apparatus and in which the transfer apparatus includes an arm having a sliding side portion adjacent the die passageway exit and having a U-shaped cutout in said sliding side portion, the cutout having the curved portion of the U defining a semi-circle whose diameter is nominally the diameter of the tubing being fed from the die.

5. In an apparatus for applying plastic grips as in claim 4 in which the pivotally mounted grip is adjacent the sliding side portion of the transfer apparatus arm, said pivoted grip being provided with an adjustable means for providing a stop for limiting the closed position of the curved grip ends as urged toward said closed position by the biased means.

6. In an apparatus for applying plastic grips as in claim 1 in which the means for advancing a determined length of tubing includes means for powering a first meshed pair of gears, each in meshed engagement with a second pair of gears, each of said second pair of gears carried by and driving a shaft upon which is mounted and rotated therewith one of a mated pair of grooved pulleys the pair of pulleys sized and spaced so as to grip and advance the tubing as the pulleys are rotated toward each other.

7. In an apparatus for applying plastic grips as in claim 6 in which each of said second pair of gears is carried on an arm movable toward and away from each other so as to permit adjustment of the spacing of the mated grooved pulleys to each other, the arms as they are moved being adapted to maintain its gear of the second pair of gears in mesh with the gear of the first pair of gears.

8. In an apparatus for applying plastic grips as in claim 1 in which the means for advancing a determined length of tubing includes a wire-advancing mechanism of the wire-forming and attaching apparatus, means for providing an intermittent rotation to the means for advancing the tubing, conductive means for transmitting power from the wire-advancing means to the means for advancing the tubing; a pair of mated grooved pulleys sized and spaced so as to grip and advance the tubing as the pulleys are rotated toward each other, and conductive means for providing rotative transmission from the intermittent motion to the pair of grooved pulleys.

9. In an apparatus for applying plastic grips as in claim 8 in which the intermittent motion is a Geneva drive.

10. In an apparatus for applying plastic grips as in claim 9 in which the conductive means from the wire-advancing mechanism to the means for advancing the tubing is a flexible drive such as a timing belt drive and the like, and in which the mated grooved pulleys are driven by a train of gears one of which is rotated by a shaft receiving the intermittent rotation.

11. In an apparatus for applying plastic grips as in claim 10 in which the grooved pulleys are each carried on a shaft mounted in one of a pair of arms movable toward and away from each other so as to permit adjustment of the spacing of the mated grooved pulleys to each other.

12. In an apparatus for applying plastic grips as in claim 1 in which the means for advancing a determined length of tubing includes a wire-advancing drive for feeding a length of substantially straight wire into a bending and applying apparatus; a gear train having means for providing intermittent rotation to the output portion of the train; a flexible drive extending from the wire-advancing drive to the gear train; a pair of mated grooved pulleys carried on a pair of shafts driven by the gear train, the pulleys adapted to grasp and transport the tubing; a pair of pivotally mounted arms each adapted for the arm to be movable to and fixed in a selected position so that the mated grooved pulleys are spaced to receive and grip a tubing of a determined size, so that as the wire-advancing drive is actuated the mated grooved pulleys for the period of intermittent rotation are rotated to feed a determined length of tube.

13. In an apparatus for applying plastic grips as in claim 12 in which the intermittent motion is provided by a Geneva motion drive having a ratio-of-motion-to-dwell such that the tubing advance is made by rotation of the mated grooved tubing pulleys during a period which is at least less than half the period of wire advance; and in which the means for moving the transfer apparatus is a cam actuated means including a cam carried and rotated by a crankshaft of a bail-forming and attaching apparatus and a cam follower carried on one end of a pivotally movable arm member of the cutoff and transfer apparatus, said arm movable by a differential of cam displacement to move the cutoff and transfer apparatus to the first and second limits of movement; and in which the means for releasing the cut tube portion is a pivotally mounted grip member of the cutoff and transfer apparatus, the grip member having a curved portion providing a cam surface on the outer end of said mounted grip member and curved so that as urged by a bias means is moved into a tube gripping position and with the tube in engagement with the cam surface as said cam surface grips the outer surface of the wire retained tube and is moved over said outer surface, the grip member is pivotally moved against the bias means and into a releasing condition with the cut tube portion.

14. In a method of providing a plastic tubing handgrip and the like on a wire bail handle as the wire is advanced into a bail-forming and applying apparataus, the handgrip being cut from a longer length of tubing and transferred to a precise position in axial alignment with a straight length of wire before the wire is bent into a U-shaped bail, the method including the steps of: (a) advancing a length of plastic tubing and the like into and through a die; (b) feeding a determined length of tubing into a cutoff and transfer apparatus while said apparatus is at a fixed limit of operation; (c) moving the cutoff and transfer apparatus to a second limit of operation so that as the apparatus is moved it cuts and transfers the tube portion in the apparatus; (d) maintaining the cutoff tube in the second limit of operation while a substantially straight length of wire for making a bail is advanced to and through the cut tubing; (e) releasing the cutoff and transfer apparatus from the cut tube portion after the passing of the wire therethrough, and (f) returning the cutoff and transfer apparatus to the first limit of operation.

15. In a method of providing a plastic tubing handgrip as in claim 14 in which the moving of the cutoff and transfer apparatus and the releasing of the tube from the apparatus includes the further steps of: gripping the tube in the transfer apparatus with the tube held between fixed and pivoted members, the pivoted member being spring biased into a tube-retaining position, and camming the pivoted member into the tube-releasing position by the movement of the transfer apparatus toward the first position.

16. In a method of providing a plastic tubing handgrip as in claim 15 in which the advancing of the wire and the advancing of the tubing is in timed relationship and is produced by conductive power means extending from a wire-advancing mechanism to a tubing-advancing mechanism.

17. In a method of providing a plastic tubing handgrip as in claim 14 in which the advancing of the plastic tubing is by means of feeding the tubing into and through a mated pair of grooved pulleys maintained in determined spaced relationship to each other to provide a positive gripping action on the tubing being fed.

References Cited

UNITED STATES PATENTS

| | | | |
|---|---|---|---|
| 865,001 | 9/1907 | Thompson | 140—75 |
| 891,734 | 6/1908 | Reynolds et al. | 140—75 |
| 1,070,696 | 8/1913 | Kempster | 140—75 |
| 2,777,520 | 1/1957 | Grzenkowski et al. | 83—154 |
| 2,823,153 | 2/1958 | Bunnell et al. | 29—234 |
| 2,984,046 | 5/1961 | Brewer et al. | 29—622 |
| 3,123,906 | 3/1964 | Frink | 29—241 |

CHARLES W. LANHAM, Primary Examiner.

E. M. COMBS, Assistant Examiner.

U.S. Cl. X.R.

29—234, 428; 140—93